(12) United States Patent
Pratt

(10) Patent No.: US 7,080,662 B1
(45) Date of Patent: Jul. 25, 2006

(54) RAIN RECYCLING SYSTEM

(76) Inventor: James M. Pratt, P. O. Box 920624, Needham, MA (US) 02492

( * ) Notice: Subject to any disclaimer, the term of this patent is extended or adjusted under 35 U.S.C. 154(b) by 289 days.

(21) Appl. No.: 10/764,080

(22) Filed: Jan. 26, 2004

Related U.S. Application Data

(60) Provisional application No. 60/446,024, filed on Feb. 10, 2003.

(51) Int. Cl.
*E03B 11/00* (2006.01)

(52) U.S. Cl. .................. 137/565.34; 137/565.12; 137/571; 137/362

(58) Field of Classification Search .......... 137/565.01, 137/565.17, 565.34, 571, 362, 565.12, 357; 417/40; 52/11–16
See application file for complete search history.

(56) References Cited

U.S. PATENT DOCUMENTS

| | | | |
|---|---|---|---|
| 3,342,136 A * | 9/1967 | Domecki | 417/12 |
| 3,426,487 A * | 2/1969 | Forte | 52/1 |
| 5,046,529 A * | 9/1991 | Corella | 137/590.5 |
| 5,239,794 A * | 8/1993 | Klein | 52/169.6 |
| 2003/0131887 A1* | 7/2003 | Gaynier | 137/357 |
| 2004/0040598 A1* | 3/2004 | Zimmerman et al. | 137/357 |
| 2005/0205132 A1* | 9/2005 | Nagel et al. | 137/357 |

FOREIGN PATENT DOCUMENTS

JP  10-219759  * 8/1998

* cited by examiner

*Primary Examiner*—Eric Keasel
*Assistant Examiner*—Craig Schneider
(74) *Attorney, Agent, or Firm*—William Nitkin

(57) ABSTRACT

A water recycling system and method of use is disclosed for use in a building having a basement with water seepage accumulating in a sump area by providing a holding tank which receives water pumped by a sump pump for later use either in the interior or exterior of the building.

5 Claims, 1 Drawing Sheet

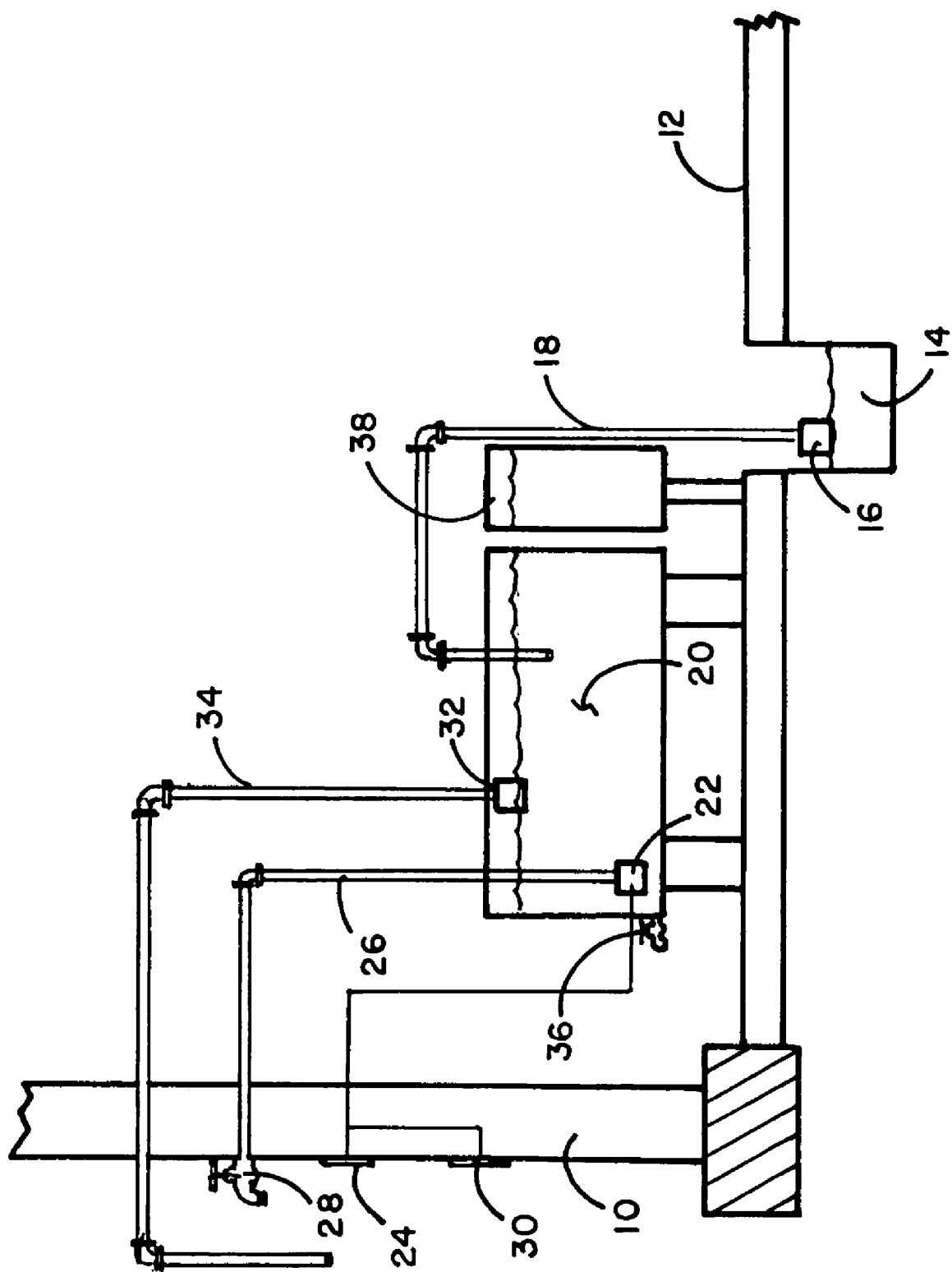

RAIN RECYCLING SYSTEM

This application claims priority and benefit of a provisional patent application entitled Rain Recycler System, Ser. No. 60/446,024 filed Feb. 10, 2003, now pending.

BACKGROUND OF THE INVENTION

1. Field of the Invention

The system and method of this invention reside in the area of utilization of rain and/or ground water that passes into a building and more particularly relate to a structure and method of accumulating rain or ground water that seeps into a building, storing such water in one or more holding tanks and then utilizing such water at a later time for ground watering or other purposes.

2. History of the Prior Art

Sump pumps are well known in the prior art. Such pumps will take the water that passes into the basement of a building, sometimes below the floor level, and pump it through pipes to drains or to the outside of the building to avoid flooding of the building or prevent damp basements if such water were allowed to accumulate in the building. Such water frequently passes into a building while it is raining so that expelling the water at the same time that it is raining gains no additional benefit as far as lawn-watering is concerned. Further, users of water for outdoor purposes usually do not participate in such activities while it is raining.

SUMMARY OF THE INVENTION

It is an object of this invention to provide a system and method to collect and store rainwater that may seep into a basement area for later use at desired times. Such desired times include times when it is not raining so that such saved water can be used for outdoor tasks, such as watering lawns, washing cars and the like.

It is a further object of this invention to conserve water by recycling water that would otherwise be wasted. Moreover, using the water stored in the system of this invention rather than municipal water for high-volume uses such as lawn-watering and car-washing saves a homeowner money by lowering his water utility bills.

To accomplish these objects a holding tank is provided in the basement of a building and an in-ground sump pump has its outflow pipe directed to pass such seeping water that is collected in the sump area into the holding tank. When it is desired for the water to be used at the exterior of the building, a first pump within the holding tank controlled by a switch mounted on the exterior of the building pumps such water through a usage pipe to a spigot which can be turned on or off and attached, for example, to a typical garden hose for use of the water that has accumulated within the holding tank. A second pump is suspended at an upper area within the holding tank which is activated when the water level in the holding tank rises to a predetermined level near the top of the holding tank, causing the second pump to pump such water through an overflow pipe to the exterior of the building so that the holding tank will not overflow into the basement area during heavy water seepage. Multiple interconnected holding tanks can be utilized to hold excessive amounts of accumulated rain or ground water.

BRIEF DESCRIPTION OF THE DRAWING

The FIGURE illustrates a schematic side view of the system and method of this invention.

DESCRIPTION OF THE PREFERRED EMBODIMENT(S)

The FIGURE illustrates a schematic side view of the system and method of this invention showing the exterior wall 10 of a building and interior floor 12. Beneath interior floor 12 is sump area 14 which accumulates water seepage whether it be from rain or ground water. Within sump area 14 is an in-ground sump pump 16 which, when activated by the sensing of water, pumps such water through first pipe 18 into holding tank 20. Holding tank 20 can be a 375-gallon tank and have an emergency valve 36 for interior drainage, if desired, or to obtain water therefrom inside the basement. First pump 22 is located at the bottom of holding tank 20. First pump 22 is activated by switch 24 located on the exterior of exterior wall 10. An electrical outlet 30 can also be attached to switch 24. First pump 22, when activated, pumps water from holding tank 20 through second pipe 26, referred to as the usage pipe, to the exterior of the building through exterior wall 10 where second pipe 26 can terminate with a typical faucet 28. Faucet 28 can be threaded to receive a garden hose and the like such that when faucet 28 is open, and for example a hose (not shown) is attached thereto and switch 24 is turned on, first pump 22 will pump water out of holding tank 20 through second pipe 26, through faucet 28 for any desired use beyond exterior wall 10, such as, for example, to water a lawn, wash a car and the like. Second pump 32 is positioned within holding tank 20 near its top and receives its power continuously from a regular outlet or direct wiring. Second pump 32 is activated when it senses water at a predetermined level near the top of the holding tank when such holding tank is almost full, and pumps water through third pipe 34, referred to as an overflow pipe, which passes through exterior wall 10 to the exterior of the building to prevent holding tank 20 from overflowing. Freeze-prevention devices can be used at the end of third pipe 34 so that if second pump 32 is activated, its discharge will not be blocked due to freezing exterior temperatures. It should be appreciated that multiple interconnected holding tanks, such as second holding tank 38, can be used to increase the holding capacity of the rain recycling system of this invention.

Although the present invention has been described with reference to particular embodiments, it will be apparent to those skilled in the art that variations and modifications can be substituted therefor without departing from the principles and spirit of the invention.

I claim:

1. A water recycling method for use in a building having an exterior wall and a basement having a sump area said building experience water seepage into said basement, comprising the steps of:

accumulating said water seepage in said sump area;

providing water sensing means to said sump area;

sensing said water accumulation in said sump area with said water sensing means;

providing a pump in said sump area;

activating said pump in said sump area by said sensing means;

providing a holding tank having a top and a bottom;

pumping said accumulated water to said holding tank;

storing said accumulated water in said holding tank;

utilizing said water in said tank in said basement, if desired;

providing a first pump at said bottom of said holding tank;

providing a usage pipe extending from said first pump through said exterior wall to the exterior of said building;

pumping said water in said holding tank by said first pump through said usage pipe extending through said wall to the exterior of said building;

utilizing said pumped water at the exterior of said building, if desired;

providing a second pump at said top of said holding tank;

providing an overflow pipe extending from said second pump through said exterior wall to the exterior of said building;

providing a sensing means for determining when said water in said holding tank reaches a predetermined level near said top of said holding tank;

activating said second pump when said sensing means senses water at said predetermined level near the top of said holding tank; and pumping said water by said second pump from said holding tank through said overflow pipe to the exterior of said building for lowering the level of said water in said holding tank to below said predetermined level of water in said holding tank.

2. The method of claim 1 further including the step of:

providing a manually operated electrical switch on the exterior of said building for activating said first pump, when desired.

3. The method of claim 2 further including the step of:

providing multiple interconnected holding tanks for increasing the water storage capacity of said system.

4. A rain recycling system for use in a building having an exterior wall and a basement with a sump area therein with water seepage into said basement accumulating in said sump area, comprising:

sensing means to sense water in said sump area;

a sump pump operating when water is sensed in said sump area;

a holding tank having a top and a bottom, said holding tank receiving water pumped by said sump pump from said sump area;

a usage pipe extending from said holding tank through said exterior wall to the exterior of said building;

a first pump positioned within said holding tank at the bottom thereof, said first pump, when activated, pumping accumulated water in said holding tank through said usage pipe to the exterior of said building through said exterior wall for any desired use;

a manually operated switch disposed on the exterior of said building for activating said first pump, when desired;

a second pump located within said holding tank near said top of said holding tank;

sensing means for sensing when water in said holding tank is approaching a predetermined level near the top of said tank; and an overflow pipe extending from said second pump to the exterior of said building through said exterior wall, said sensing means, upon sensing water near the top of said tank at said predetermined level, activating said second pump for pumping water from near the top of said holding tank through said overflow pipe to the exterior of said building through said exterior wall to prevent overflow of water in said holding tank into said basement area and to recycle said water pumped to the exterior of said building for any desired use.

5. The system of claim 4 further including:

at least one other holding tank interconnected to said holding tank for increasing the water storage capacity of said system.

* * * * *